(12) United States Patent
Ota et al.

(10) Patent No.: US 8,488,473 B2
(45) Date of Patent: Jul. 16, 2013

(54) VOICE COMMUNICATION QUALITY ASSESSING SYSTEM

(75) Inventors: Yasuji Ota, Kawasaki (JP); Takeshi Otani, Kawasaki (JP); Masakiyo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 188 days.

(21) Appl. No.: 12/700,200

(22) Filed: Feb. 4, 2010

(65) Prior Publication Data
US 2010/0135185 A1 Jun. 3, 2010

Related U.S. Application Data

(63) Continuation of application No. PCT/JP2007/065827, filed on Aug. 13, 2007.

(51) Int. Cl.
H04L 12/26 (2006.01)
H04M 1/24 (2006.01)

(52) U.S. Cl.
USPC ............... 370/241; 370/523; 370/528

(58) Field of Classification Search
None
See application file for complete search history.

(56) References Cited

U.S. PATENT DOCUMENTS

| | | | |
|---|---|---|---|
| 6,956,819 B1 | 10/2005 | Yamada et al. | |
| 7,376,132 B2 * | 5/2008 | Conway | 370/389 |
| 7,746,797 B2 * | 6/2010 | El-Hennawey et al. | 370/250 |
| 2004/0071084 A1 | 4/2004 | El-Hennawey et al. | |
| 2005/0175191 A1 | 8/2005 | Horie | |

FOREIGN PATENT DOCUMENTS

| | | |
|---|---|---|
| JP | 03-226145 | 10/1991 |
| JP | 7-250107 | 9/1995 |
| JP | 9-6383 | 1/1997 |
| JP | 9-200878 | 7/1997 |
| JP | 2000-332758 | 11/2000 |
| JP | 2004/091183 | 10/2004 |
| WO | WO 2004/091183 | 10/2004 |

OTHER PUBLICATIONS

International Search Report mailed Oct. 9, 2007 for International Application No. PCT/JP2007/065827.
Japanese Office Action mailed Jan. 10, 2012 issued in corresponding Japanese Patent Application No. 2009-527996.
Extended European Search Report dated Mar. 12, 2013, from corresponding European Application No. 07792470.2.

* cited by examiner

Primary Examiner — Min Jung
(74) Attorney, Agent, or Firm — Staas & Halsey LLP

(57) ABSTRACT

A system for assessing a voice communication quality of a communication path between first and second nodes over a network, wherein coded data of voice communication signals are transferred in a stream of packets via the communication path, including: a capturing unit for capturing at the first node at least one packet containing coded data representing non voice signals among the packets of the coded data to be transferred from the first node to the second node; a replacing unit for replacing a part of the coded data representing non voice signals in the captured packet with a predetermined code before the captured packet is transferred from the first node; a retrieval unit for retrieving at the second node said at least one packet containing coded data representing non voice signals; and an assessment unit for assessing the voice communication quality of the communication path.

11 Claims, 8 Drawing Sheets

VOICE COMMUNICATION QUALITY ASSESSING SYSTEM

CROSS-REFERENCE TO RELATED APPLICATION

This is a continuation of Application PCT/JP2007/065827, filed on Aug. 13, 2007, the entire contents of which are incorporated herein by reference.

FIELD

A certain aspect of the embodiments discussed herein relates to a technique of assessing a voice communication quality of a communication path.

BACKGROUND

Networks are shifting from current circuit switching networks to packet exchange networks, and Next Generation Network (NGN) representing such shift has been established. The NGN is configured to implement voice communication using the network while maintaining voice communication quality equivalent to the quality of the current circuit switching networks and so on.

Thus, it is more important to estimate voice communication quality in a next generation network represented by the NGN, and measurement technology for evaluating voice communication quality on a middle path and a terminal of the network is required. That is, technology for testing voice quality degradation used for estimating the voice communication quality from data being transferred is necessary. In particular, technology for analyzing data during operation, i.e., so called active measurement technology is required.

Japanese Laid-open Patent Publication No. 2000-332758 and Japanese Laid-open Patent Publication No. 07-250107 disclose technology for estimating voice quality.

SUMMARY

According to an aspect of an embodiment, a system for assessing a voice communication quality of a communication path between first and second nodes over a network, wherein coded data of voice communication signals are transferred in a stream of packets via the communication path, the system includes: a capturing unit for capturing at the first node at least one packet containing coded data representing non voice signals among the packets of the coded data to be transferred from the first node to the second node; a replacing unit for replacing a part of the coded data representing non voice signals in the captured packet with a predetermined code before the captured packet is transferred from the first node; a retrieval unit for retrieving at the second node said at least one packet containing coded data representing non voice signals transferred from the first node; and an assessment unit for assessing the voice communication quality of the communication path on the basis of detection of the predetermined code in the retrieved packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
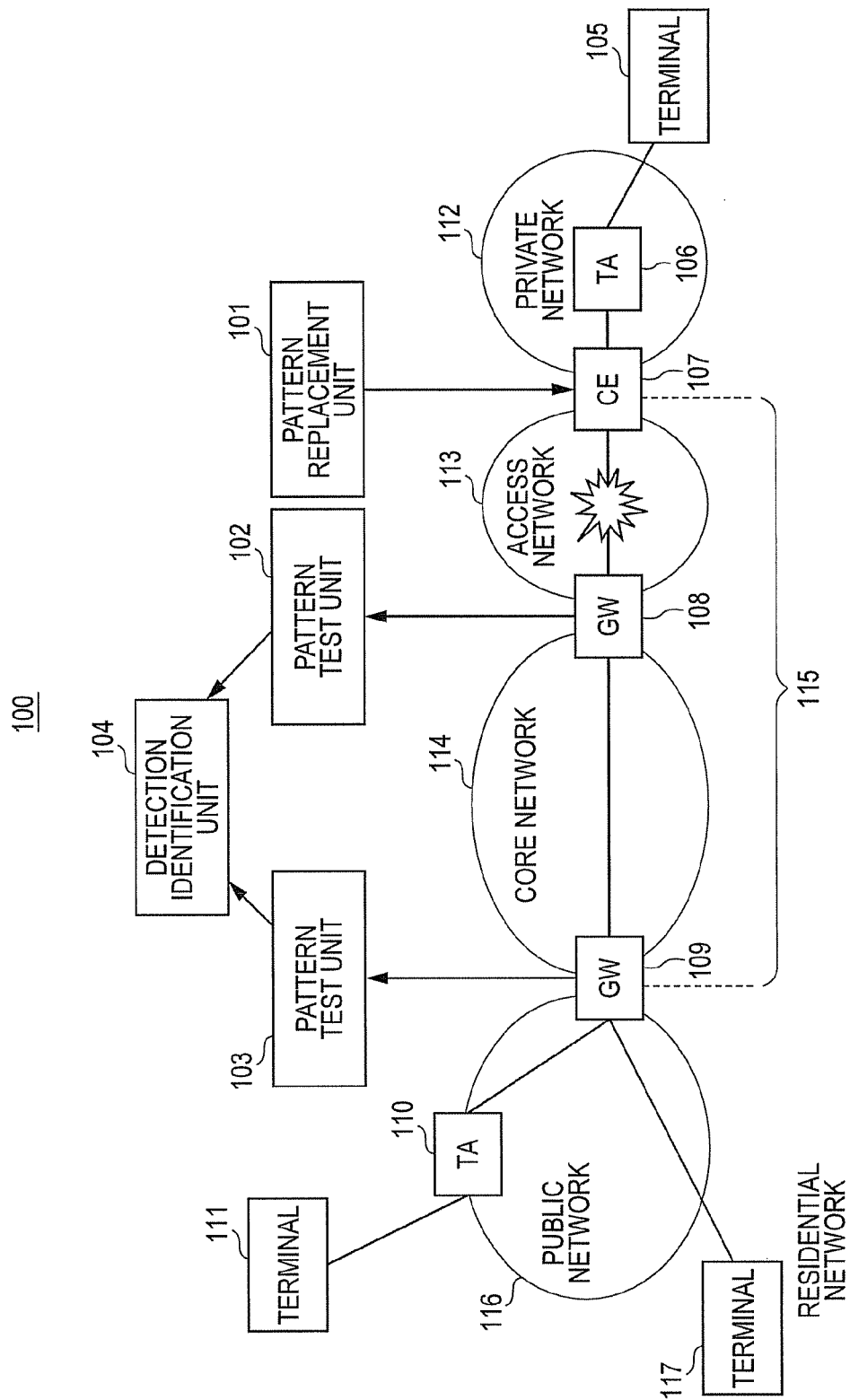
FIG. 1 illustrates a network system of the embodiment configured to test voice quality degradation.

FIG. 1 illustrates a network system 100 of the embodiment configured to test voice quality degradation. According to the embodiment, a test for a voice quality degradation factor of the network system 100 will be explained hereafter. According to the test method of the embodiment, a factor of voice quality degradation caused by a change of data itself transferred by the network system 100 such as noise inserted in a quality controlled area 115 of the network system 100 can be detected while the network is being practically operated. Incidentally, operations of a pattern replacement unit 101 and pattern test units 102 and 103 will be explained in detail with reference to FIG. 4 and FIG. 5.

[Configuration of Network System 100]

The network system 100 is constituted by the pattern replacement unit 101, the pattern test units 102 and 103, a detection identification unit 104, a terminal adaptor (TA) 106, a core edge (CE) 107, gateways 108 and 109, a terminal adaptor (TA) 110 and terminals 111 and 117. According to the embodiment, a terminal 105 performs voice communication with the terminals 111 and 117 through a private network 112, an access network 113, a core network 114 and a public network 116. Specifically, the network system 100 is a network system in which the terminal 105 obtains a voice signal as an interface, encodes the voice signal and transfers the voice signal to the terminals 111 and 117 in real time in an IP packet form and so on (VoIP: Voice over Internet Protocol).

The network system 100 is a network system configured to detect a problem that occurs in the quality controlled area 115 (the access network 113 and the core network 114) by using the pattern replacement unit 101 and the pattern test units 102 and 103. The network system 100 of the embodiment can detect voice quality degradation caused by noise inserted in the quality controlled area 115 in the network. Further, the network system 100 of the embodiment can also detect voice quality degradation caused by transcoding such that a compression format of data is converted in the quality controlled area 115 in the network.

The pattern replacement unit 101 replaces a portion of a non-voice code to be sent to the quality controlled area 115 with a particular pattern. Then, the pattern test units 102 and 103 detect the particular pattern in the quality controlled area 115. The detection identification unit 104 senses an involved factor of voice quality degradation from whether or not the particular pattern has been detected. The particular pattern of the embodiment is a code pattern that the pattern replacement unit 101 and the pattern test units 102 and 103 mutually hold, and is a code pattern that has been determined in advance.

Further, the particular pattern is a code sequence having same weights of a plurality of code series.

Thus, the network system 100 can test a factor of voice quality degradation of data flowing through the quality controlled area 115 in the network system 100 even while the network is being practically operated. According to the test method of the embodiment, voice quality degradation caused by inserted noise that changes data itself can be detected as well as other voice quality degradation caused by a data delay or a packet loss.

The pattern replacement unit 101 is provided at the CE107, i.e., a point corresponding to an entrance to the quality controlled area 115 (the access network 113 and the core network 114). The pattern replacement unit 101 replaces a portion of a non-voice code with a particular pattern for sensing a problem. The non-voice code described here is a code corresponding to background noise included in a code that the terminal 105 produces by receiving a voice signal as an interface and encoding the received voice signal. Codec technology of the embodiment is, e.g., G. 711 recommended by ITU-T. Thus, an analog voice signal received by the terminal 105 is encoded in accordance with G. 711. The TA 106 encodes and decodes (codec) the analog voice signal. The terminals 105, 111 and 117 may be configured to encode and decode the analog voice signal into a digital voice signal. The encoding technology according to G. 711 recommended by ITU-T is a system for implementing a data rate of 64 kbps on a telephone line by using a PCM (pulse code modulation) system. Specifically, the analog signal is sampled at 8 kHz (sampling), and every sample is represented in 8 bits.

The pattern replacement unit 101 takes in a code 300 transferred by the network system 100 through the CE 107 every frame of 20 msec including 160 samples. Then, the pattern replacement unit 101 analyzes a voice characteristic of the code 300, and detects a non-voice frame. The voice characteristic indicates data classifying every frame of the code 300 into a voice frame and a non-voice frame. Specifically, the voice characteristic is formed by a number of zero-crossings and an amplitude level. The number of zero-crossings represents how many times a voice waveform crosses a zero level in a certain period of time. The amplitude level is an average amplitude value of each of data 310-318 in a certain period of time. The pattern replacement unit 101 identifies a frame of a data amplitude level being equal to or greater than a certain value and of a number of zero-crossings being equal to or smaller than a certain number in a certain period of time as a voice frame. Then, the pattern replacement unit 101 identifies a frame other than the voice frame as a non-voice frame.

Further, the pattern replacement unit 101 analyzes a characteristic of a frame identified as a non-voice frame. The pattern replacement unit 101 detects a background noise level from the characteristic analysis. Then, the pattern replacement unit 101 replaces a portion of a level range lower than or around the detected background noise level of the detected non-voice frame with a particular pattern. The level described here is an amplitude value when one sample of an analog signal is encoded to 8-bit data in accordance to G. 711. The less significant digit and the more significant digit of the 8-bit data indicate portions of the smaller and greater amplitude values, respectively.

The pattern replacement unit 101 does not perform a particular pattern replacement process for a silent frame. The silent frame is a frame such that frame data includes all zero bits or at most bits indicating a faint sound of a value equal to or lower than a certain threshold. A reason why is that replacement of a portion of the silent frame with the particular pattern affects subjective sound quality a lot. Thus, as a portion of the silent frame is not replaced with the particular pattern, the pattern replacement unit 101 can prevent noise from being inserted by using a masking effect (refer to Wegel, R. L. and Lane, C. E.: Phys. Rev., 23, pp. 266-285 (1924)).

According to the test method of the embodiment, the pattern replacement unit 101 replaces a portion of a non-voice code with the particular pattern. Thus, an amount of data that flows through the network system 100 does not increase. Hence, according to the test method of the embodiment, a traffic increase in the network caused by the test for voice quality degradation can be removed. That is, the test method of the embodiment enables the voice quality degradation to be tested without causing ill effects such as a traffic increase in the network and resultant congestion.

The pattern test units 102 and 103 are provided at the GWs 108 and 109, respectively. The pattern test units 102 and 103 take in the code 300 transferred by the network system 100 through the GWs 108 and 109, respectively, every frame of 20 msec including 160 samples. The pattern test units 102 and 103 choose a non-voice frame as a frame to be tested. A reason why is that the pattern replacement unit 101 performs a replacement process with the particular pattern for a non-voice frame. The pattern test units 102 and 103 detect a background noise level from a characteristic analysis of a frame identified as a non-voice frame. The pattern test units 102 and 103 refer to the background noise level, and examine whether or not the particular pattern exists in a frame to be tested of a level lower than or around the background noise level. The pattern test units 102 and 103 can thereby efficiently detect the particular pattern. A reason why is that a replacement position of the particular pattern is of a level equal to or lower than the background noise level of the frame to be tested.

Then, the pattern test units 102 and 103 send existence data indicating whether or not the particular pattern exists to the detection identification unit 104. The detection identification unit 104 detects a problem and estimates where the problem occurs from the existence data. Specifically, in a case where the non-voice frame for which the pattern replacement unit 101 has performed the replacement process includes a particular pattern, the detection identification unit 104 identifies no occurrence of voice quality degradation. Meanwhile, in a case where the particular pattern does not exist in the non-voice frame for which the pattern replacement unit 101 has performed the replacement process, the detection identification unit 104 identifies an occurrence of voice quality degradation. The detection identification unit 104 can make the above identification by comparing data of a replacement-processed non-voice frame that the detection identification unit 104 has ready beforehand and the existence data. That is, in a case where the existence data of a non-voice frame expected to include the particular pattern indicates "no particular pattern", the detection identification unit 104 identifies an occurrence of voice quality degradation. Thus, the detection identification unit 104 obtains existence data of a particular pattern 319 from the pattern test units 102 and 103, and can test existence of an occurrence of voice quality degradation of data that flows through the quality controlled area 115 in the network system 100. Further, the detection identification unit 104 can estimate a position of the occurrence of the voice quality degradation by analyzing where the pattern test units 102 and 103 are provided.

[Analog Signal 200, Code 300]

Figure 2:
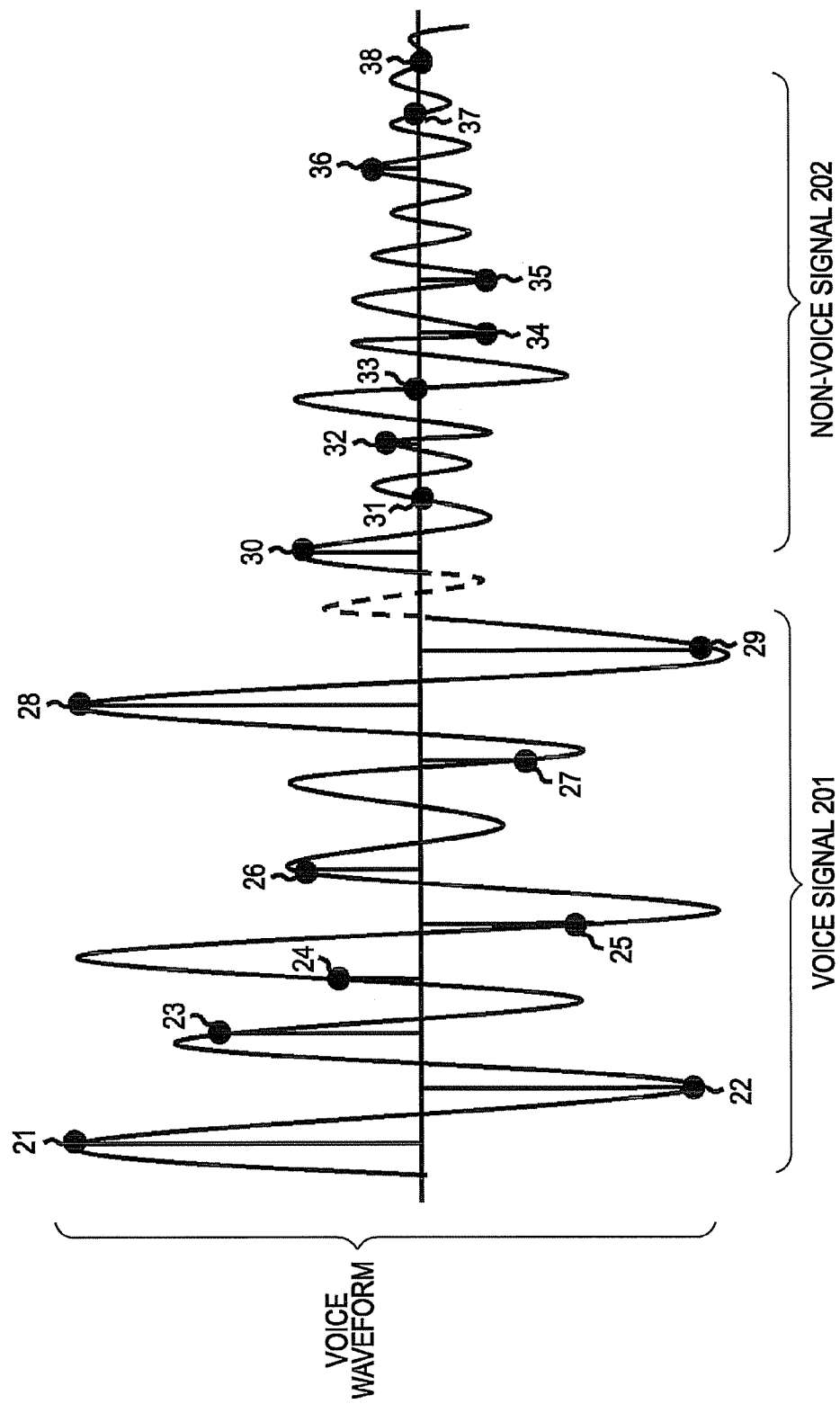
FIG. 2 is a schematic diagram of an analog signal of the embodiment.

FIG. 2 illustrates a schematic diagram of an analog signal 200 of the embodiment. The terminal 105 sends the code 300 into which the analog signal 200 is digitized to the terminals 111 and 117. The code 300 into which the analog signal 200 is digitized is to be tested with respect to the voice quality degradation.

The TA 106 of the embodiment illustrated in FIG. 1 encodes the analog signal 200 into the code 300. The TA 106 of the embodiment samples the analog signal 200 with a desired frequency. Specifically, the TA 106 samples the analog signal 200 as 21-38. Then, the TA 106 quantizes and thereby encodes amplitude values of 21-38 into data 301-318, respectively. The TA 106 of the embodiment sends the code to the network as frames of 160 samples each. That is, one frame to be sent includes 160 samples.

Figure 3:
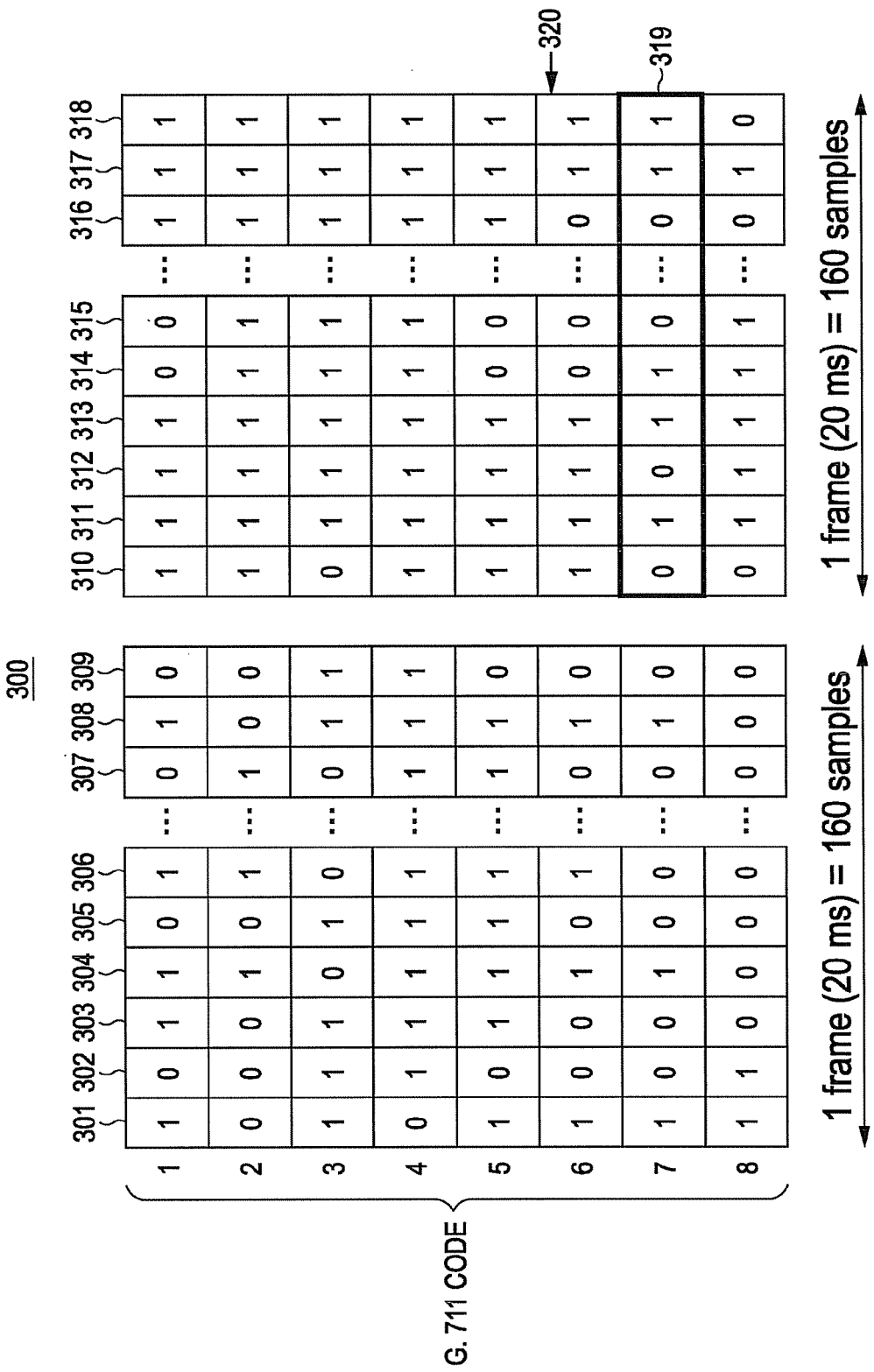
FIG. 3 is a schematic diagram of a code of the embodiment.

FIG. 3 illustrates a schematic diagram of the code 300 corresponding to the analog signal 200. The code 300 is formed by the data 301-318. Although one frame includes 160 samples as described above, FIG. 3 typically illustrates nine samples per one frame (data 301-309 and data 310-318). The data 301 is an amplitude value of a quantized and digitally encoded sampling value 21. Further, the data 302 is an encoded 22. The data (300+n) is similarly an encoded (20+n) (n is a natural number of 1-18). Encoding technology of the embodiment is G. 711. G. 711 is a waveform encoding method of analog voice data recommended by ITU-T. The sampling rate (sampling speed) is 8 kHz. The data 301-318 are in 8 bits each. The data 301 of the sampling 21 is, e.g., "10101111". The data 302 of the sampling 22 is "00110001". The data 303 of the sampling 23 is "10111000". The other following data 304-318 are in 8 bits each. The data 301-318 are in 8 bits each. First bits of the data 301-318 represent a portion of a great amplitude of the samplings 21-38, respectively. Second, third and other bits are data indicating portions of small amplitudes in the above order. One frame is formed by 160 data (samples) of the data 301-309. The network system 100 of the embodiment transfers data every frame (160 samples).

Two kinds of quantization methods, μ-Law and A-Law, are specified. The methods, μ-Law and A-Law, are one of encoding laws for converting an analog signal into a digital signal by using PCM (pulse code modulation) each. Further, G. 711 is one of simplest methods for waveform encoding called PCM (pulse code modulation). An amplitude value of each of samples sampled at 8 kHz is quantized into a discrete value of 256 (8 bit) levels. At that moment, as amplitude distribution of a voice signal illustrates exponential distribution, quantized bits can be made appear equally frequently to one another by logarithmic conversion so that distortion can be minimized. That is, a value of a small amplitude is quantized with a fine step width, and a value of a great amplitude is quantized with a coarse step width. According to G. 711, two kinds of equations, μ-law and A-law, are adopted as logarithmic conversion rules. According to G. 711, one of the conversion rules (e.g., μ-Law) is used so that the code 300 is produced.

According to the embodiment, the pattern replacement unit 101 replaces a portion of an area in the code 300 which corresponds to the non-voice signal 202 (the frame including the data 310-318) with the particular pattern 319. As illustrated in FIG. 3, the particular pattern 319 is "010110...011". A position where the pattern replacement unit 101 replaces the particular pattern 319 can be fixed depending on the background noise level. The pattern replacement unit 101 can, e.g., render a portion of bit weight equal to or less than 320.

Then, the pattern test units 102 and 103 detect the particular pattern 319 replaced by the pattern replacement unit 101. The detection identification unit 104 obtains the particular pattern 319 from the pattern test units 102 and 103, and identifies whether or not voice quality degradation exists in the code 300.

[Configuration of Pattern Replacement Unit 101]

Figure 4:
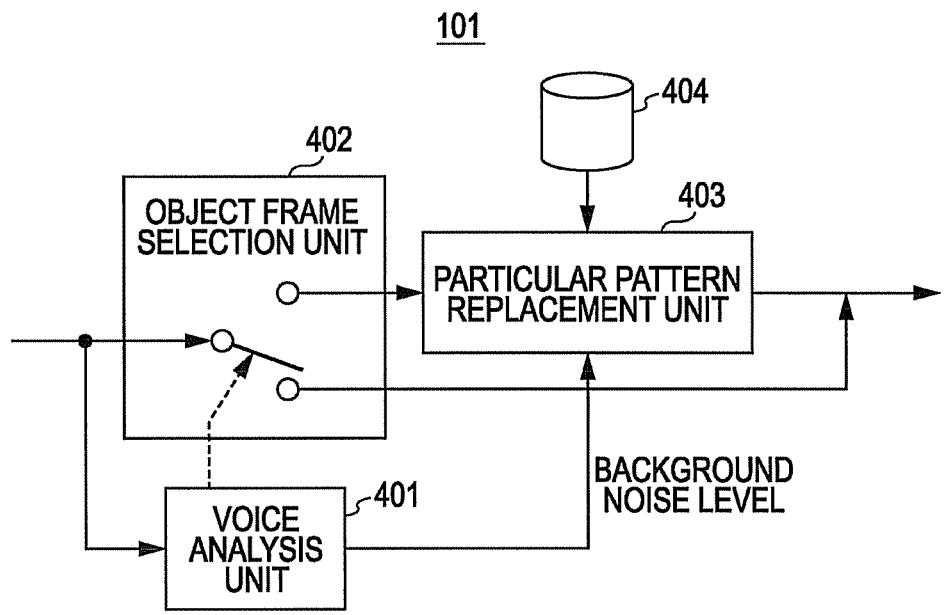
FIG. 4 is a block diagram of a pattern replacement unit of the embodiment.

FIG. 4 illustrates a block diagram of the pattern replacement unit 101 of the embodiment illustrated in FIG. 1. Operation of the pattern replacement unit 101 will be explained below in detail with reference to FIG. 4.

The pattern replacement unit 101 is constituted by a voice analysis unit 401, an object frame selection unit 402, a particular pattern replacement unit 403 and a detection use pattern saving unit 404.

The voice analysis unit 401 takes in the code 300 illustrated in FIG. 3 from the CE 107 illustrated in FIG. 1 every frame of 20 msec including 160 samples. Then, the voice analysis unit 401 analyzes a voice characteristic of the code 300 that has been taken in. The voice characteristic is data that classifies every frame of the code 300 into a voice frame and a non-voice frame. Specifically, the voice characteristic is formed by a number of zero-crossings and an amplitude level. The number of zero-crossings represents how many times a voice waveform crosses a zero level in a certain period of time. The amplitude level is an average amplitude value of each of data 310-318 in a certain period of time. The voice analysis unit 401 identifies a frame of a data amplitude level being equal to or greater than a certain value and of a number of zero-crossings being equal to or smaller than a certain number in a certain period of time as a voice frame. In order to prevent portions of small amplitudes corresponding to a rise and a fall in voice from being clipped at a start and an end of a voice frame interval, respectively, the voice analysis unit 401 brings the start of the voice frame interval forward and puts the end of the voice frame interval off so as to severally give margins for identifying voice and non-voice frames.

The object frame selection unit 402 selects the non-voice frame that the voice analysis unit 401 has detected as a frame to be replaced with the particular pattern 319. Why the object frame selection unit 402 does not cause a voice frame to be a frame to be replaced with the particular pattern 319 is for preventing the particular pattern 319 from causing noise. Meanwhile, a non-voice frame is in general background noise data. Thus, a partial change of a non-voice frame can hardly be sensed as voice quality degradation.

The particular pattern replacement unit 403 replaces a portion of the non-voice frame that the object frame selection unit 402 has selected with the particular pattern 319. The particular pattern replacement unit 403 of the embodiment replaces a seventh bit of the non-voice frame with the particular pattern 319 (see FIG. 3). The seventh bit of the non-voice frame means a code sequence corresponding to the seventh row from the MSB (Most Significant Bit) of the G. 711 code (data 310-318) of the non-voice frame illustrated in FIG. 3. That is, the data 310-318 are arranged in chronological order for the code 319 illustrated in FIG. 3. And the particular pattern replacement unit 403 replaces the seventh row corresponding to a portion of a small amplitude of the non-voice signal 202 with the particular pattern 319.

The voice analysis unit 401 performs an amplitude analysis of a frame identified as a non-voice frame, and determines a background noise level 320. The amplitude analysis is a process by means of the voice analysis unit 401 for averaging amplitude values of non-voice frames for a certain period of time so as to cause the average value to be the background noise level. The particular pattern 319 is saved in the detection use pattern saving unit 404. The particular pattern replacement unit 403 reads the particular pattern 319 from the detection use pattern saving unit 404. Then, the particular pattern replacement unit 403 replaces a portion of a non-voice frame with the particular pattern 319 with reference to the background noise level 320. That is, the particular pattern replacement unit 403 replaces the seventh row of the non-voice frame with the particular pattern 319 ("010110 . . . 011"). As a replacement position of the particular pattern 319 is equal to or lower than the background level, the particular pattern replacement unit 403 refers to the background noise level 320. Further, the particular pattern replacement unit 403 does not perform a replacement process of the particular pattern 319 for a non-voice frame of volume imperceptible for a person.

[Processing Procedure of Pattern Replacement Unit 101]

Figure 6:
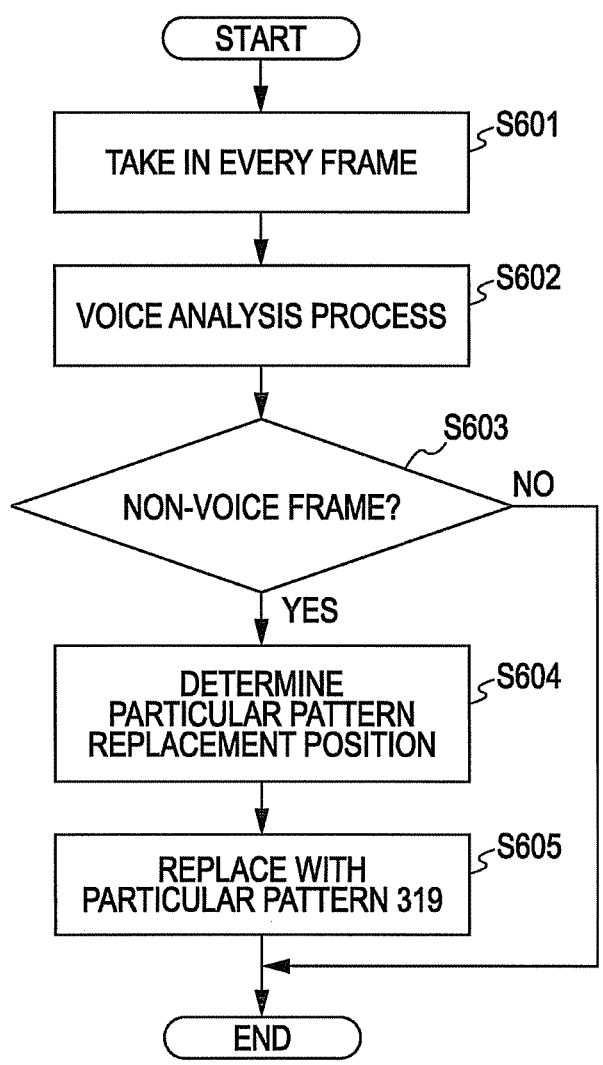
FIG. 6 is a flowchart of a process performed by the pattern replacement unit of the embodiment.

FIG. 6 illustrates a flowchart of a process performed by the pattern replacement unit 101. Further, FIG. 4 illustrates a configuration of the pattern replacement unit 101. The process flowchart illustrated in FIG. 6 will be explained below with reference to the configuration of the pattern replacement unit 101 illustrated in FIG. 4.

The voice analysis unit 401 takes in the code 300 illustrated in FIG. 3 every frame (160 samples) (step S601).

The voice analysis unit 401 performs a voice analysis process on the code 300 from the voice characteristic of the code 300 that has been taken in (step S602).

The voice analysis unit 401 identifies whether the frame that has been taken in is a voice frame or a non-voice frame in order from a result of the voice analysis process (step S603). The voice analysis unit 401 identifies a frame of an amplitude level of the data forming the code 300 being equal to or greater than a certain value and of a number of zero-crossings being equal to or smaller than a certain number in a certain period of time as a voice frame, and identifies a frame other than that as a non-voice frame.

If the voice analysis unit 401 identifies the frame that has been taken in as a non-voice frame (step S603 YES), the particular pattern replacement unit 403 fixes a position of the non-voice frame to be replaced with the particular pattern 319 (particular pattern replacement position) (step S604). The particular pattern replacement unit 403 fixes the particular pattern replacement position with reference to the background noise level 320. On this occasion, the voice analysis unit 401 determines the background noise level 320. The particular pattern replacement unit 403 causes a code pattern in a level range equal to or lower than the background noise level to be replaced with the particular pattern. The code pattern is a combination of bits of samples illustrating a same amplitude level in a frame formed by a plurality of samples. In other words, the code pattern is a chain of codes having a same bit weight in a frame formed by a plurality of samples. A portion of the code pattern to be replaced is formed by a combination of the codes in a level range equal to or lower than the background noise level, and the one formed with respect to the amplitude level is an example.

The voice analysis unit 401 calculates an average value of amplitude values of a non-voice frame for a certain period of time, and causes the average value to be the background noise level. Further, the voice analysis unit 401 may be configured to calculate an average value of amplitude values of a past non-voice frame and to cause the average value to be the background noise level. The past non-voice frame means a non-voice frame existing chronologically ahead of the non-voice frame to be replaced with the particular pattern 319. Further, the past non-voice frame is in other words a non-voice frame that the voice analysis unit 401 receives, and a non-voice frame that the voice analysis unit 401 receives before receiving the non-voice frame to be partially replaced with the particular pattern 319. Further, the position of the non-voice frame to be replaced with the particular pattern 319 by the particular pattern replacement unit 403 (particular pattern replacement position) is a position of a code belonging to a level equal to or lower than the background noise level. The particular pattern replacement unit 403 replaces a code pattern that is a portion of a non-voice frame selected by the object frame selection unit 402 and of a level range equal to or lower than the background noise level (step S605).

Further, if the voice analysis unit 401 identifies the frame as not being a non-voice frame (step S603 NO), the pattern replacement unit 101 ends the replacement process.

[Configuration of Pattern Test Units 102 and 103]

Figure 5:
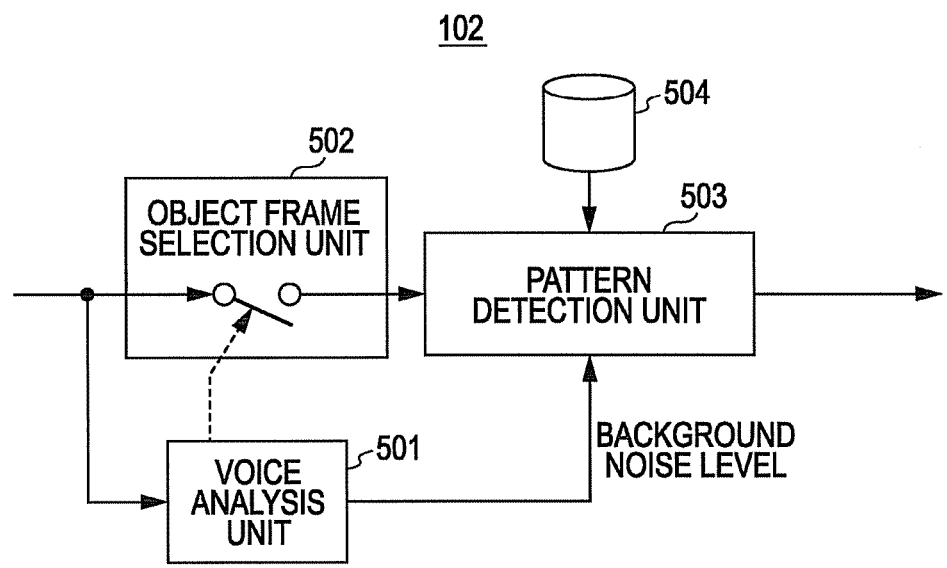
FIG. 5 is a block diagram of a pattern test unit of the embodiment.

FIG. 5 illustrates a block diagram of the pattern test unit 102 of the embodiment. The pattern test unit 102 is constituted by a voice analysis unit 501, an object frame selection unit 502, a pattern detection unit 503 and a detection use pattern saving unit 504. Operation of the pattern test unit 102 will be explained below in detail with reference to FIG. 5. The pattern test unit 103 has a same configuration and performs a same operation process as the pattern test unit 102.

The voice analysis unit 501 takes in the code 300 illustrated in FIG. 3 from the GW 108 illustrated in FIG. 1 every frame of 20 msec including 160 samples. Then, the voice analysis unit 501 identifies whether the frame that has been taken in is a voice frame or a non-voice frame in order. Specifically, the voice analysis unit 501 analyzes a voice characteristic of the code 300, and classifies every frame into a voice frame and a non-voice frame. In order to prevent portions of small amplitudes corresponding to a rise and a fall in voice from being clipped at a start and an end of a voice frame interval, respectively, the voice analysis unit 501 also brings the start of the voice frame interval forward and puts the end of the voice frame interval off so as to severally give margins for identifying voice and non-voice frames.

The object frame selection unit 502 selects the non-voice frame identified by the voice analysis unit 501 as a frame to be replaced with the particular pattern 319. That is, an object to be tested by the pattern test unit 503 is a non-voice frame. The pattern test unit 503 does not test a voice frame.

The pattern detection unit 503 identifies whether or not the particular pattern 319 exists in the non-voice frame selected by the object frame selection unit 502. The particular pattern to be detected by the pattern detection unit 503 is saved in the detection use pattern saving unit 504. The pattern detection unit 503 reads the particular pattern saved in the detection use pattern saving unit 504, and identifies whether or not the particular pattern exists in the non-voice frame while referring to the particular pattern. On this occasion, the voice analysis unit 501 performs an amplitude value analysis of the non-voice frame, and determines a background noise level. The pattern detection unit 503 identifies whether or not the particular pattern exists in the non-voice frame with reference to the background noise level. That is, the pattern detection unit 503 identifies whether or not the particular pattern exists in the level range equal to or lower than the background noise level. Thus, as the pattern detection unit 503 does not search a level range higher than the background noise level for the particular pattern, the particular pattern detection can be made more efficient.

The pattern detection unit 503 provides the detection identification unit 104 with pattern replacement existence data indicating whether or not the particular pattern exists in the tested non-voice frame.

[Process Procedure of Pattern Test Unit 102]

Figure 7:
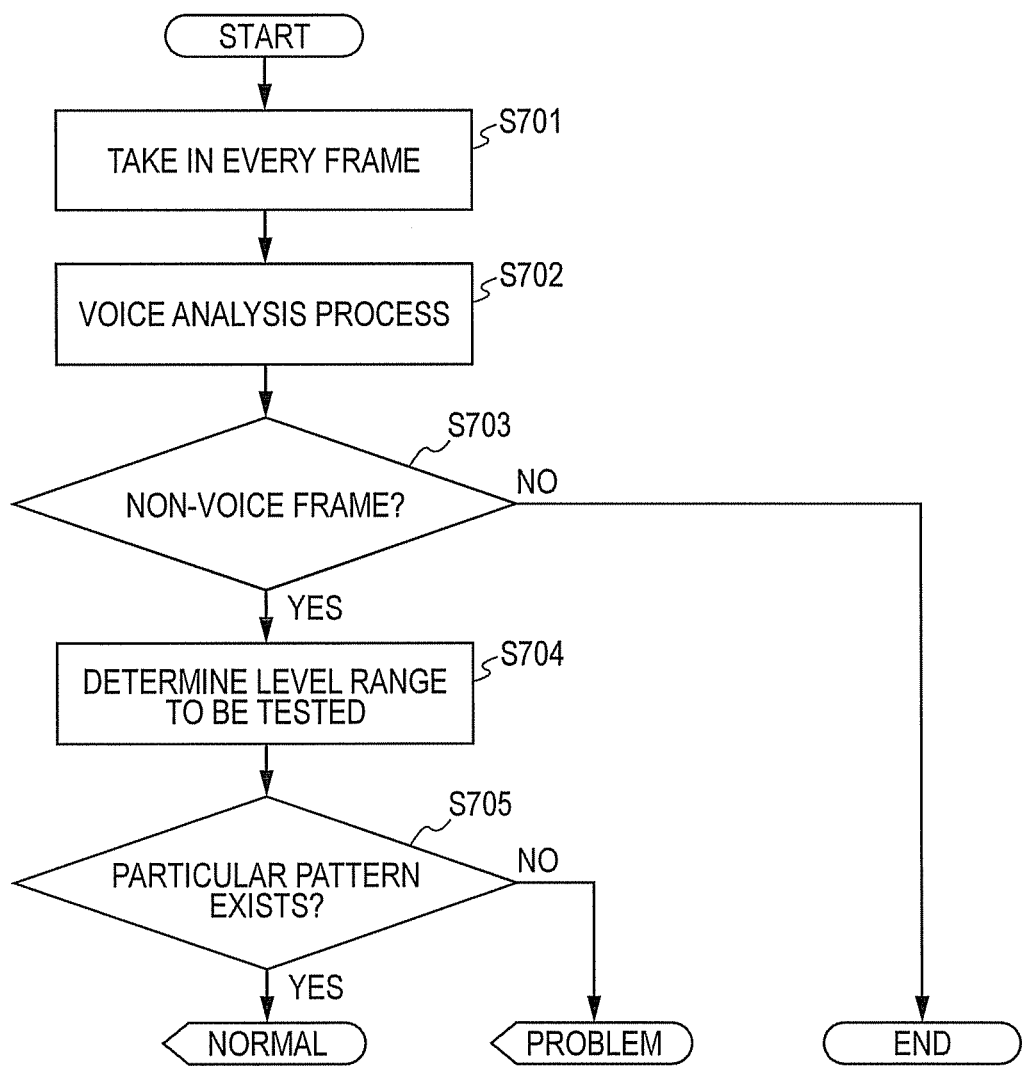
FIG. 7 is a flowchart of a process performed by the pattern test unit of the embodiment.

FIG. 7 illustrates a flowchart of a process performed by the pattern test unit 102 of the embodiment. The pattern test unit 102 detects the particular pattern 319 in the non-voice frame.

The pattern test unit 103 performs a same process as the pattern test unit 102. Further, FIG. 5 illustrates a configuration of the pattern test unit 102. The process flowchart illustrated in FIG. 7 will be explained below with reference to the configuration of the pattern replacement unit 101 illustrated in FIG. 5.

The voice analysis unit 501 takes in the code 300 from the GW 108 every frame of 20 msec including 160 samples (step S701).

The voice analysis unit 501 performs a voice analysis process on the code 300 from the voice characteristic of the code 300 that has been taken in (step S702).

The voice analysis unit 501 identifies whether the frame that has been taken in is a voice frame or a non-voice frame in order from a result of the voice analysis process (step S703).

If the voice analysis unit 501 identifies the frame that has been taken in as a non-voice frame (step S703 YES), the object frame selection unit 502 selects the non-voice frame as an object to be tested with respect to the particular pattern. Then, the pattern test unit 503 obtains the background noise level from the voice analysis unit 501, and determines with reference to the background noise level a level range in which the particular pattern of the non-voice frame is tested (step S704). Specifically, the level range in which the particular pattern is tested described above is a portion of the code pattern in the non-voice frame of a level equal to or lower than the background noise level. The level described here is an amplitude value when one sample of an analog signal is encoded to 8-bit data in accordance to G. The less significant digit and the more significant digit of the 8-bit data represent portions of the smaller and greater amplitude values, respectively.

The pattern detection unit 503 identifies whether or not the particular pattern 319 exists in a level range equal to or lower than the background noise level in the non-voice frame selected by the object frame selection unit 502 (step S705). The particular pattern to be detected by the pattern detection unit 503 is saved in the detection use pattern saving unit 504. The pattern detection unit 503 reads the particular pattern saved in the detection use pattern saving unit 504, and identifies whether or not the particular pattern exists in the level range equal to or lower than the background noise level in the non-voice frame while referring to this particular pattern.

Upon identifying the particular pattern as existing in the non-voice frame (S705 YES), the pattern detection unit 503 sends pattern replacement existence data indicating that the particular pattern exists in the non-voice frame to the detection identification unit 104. What is described above means that the particular pattern with which the pattern replacement unit 101 has replaced a portion of the non-voice frame has not changed and has flown in the quality controlled area 115, and illustrates that degradation of the sound quality of the code 300 has not occurred.

Upon identifying the particular pattern as not existing in the non-voice frame (step S705 NO), the pattern detection unit 503 sends pattern replacement absence data indicating that no particular pattern exists in a non-silent frame to the detection identification unit 104. What is described above means that the particular pattern with which the pattern replacement unit 101 has replaced a portion of the non-voice frame has changed and has flown in the quality controlled area 115, and illustrates that a change such as degradation of the sound quality of the code 300 has occurred.

The pattern detection unit 503 provides the detection identification unit 104 with pattern replacement existence/absence data (indicating the pattern replacement existence data and the pattern replacement absence data) indicating whether or not the particular pattern exists in the tested non-voice frame.

Further, if the voice analysis unit 501 identifies the frame that has been taken in as a voice frame at the step S703 (step S703 NO), the pattern test unit 101 does not perform the replacement process of the particular pattern 319.

[Configuration of Pattern Replacement Unit 800]

Figure 8:
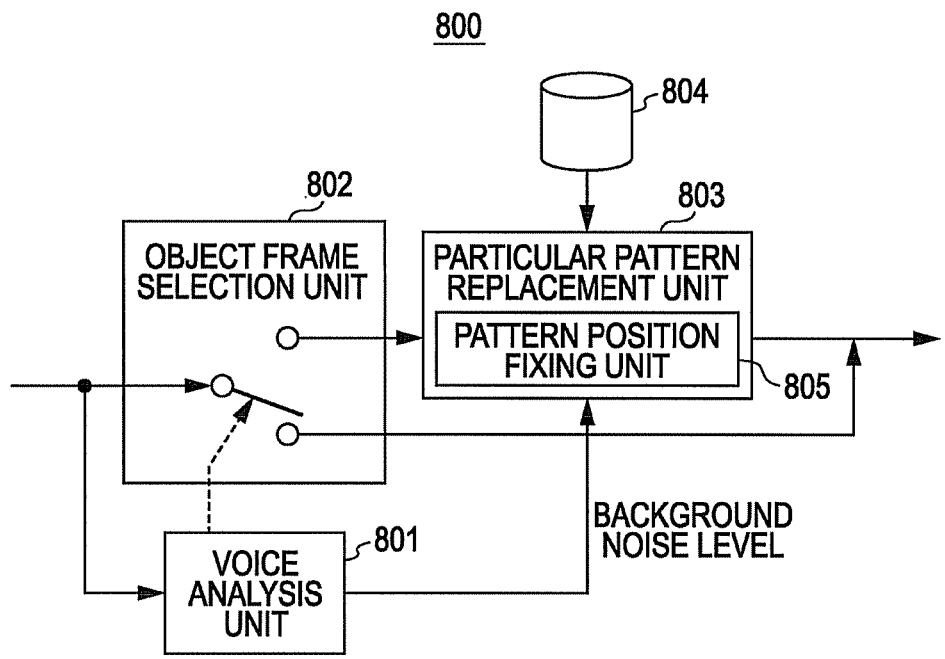
FIG. 8 is a block diagram of a pattern replacement unit of the embodiment.

FIG. 8 illustrates a block diagram of a pattern replacement unit 800 of the embodiment. For a series of frames to be replaced and identified as non-voice frames, the pattern replacement unit 800 changes a position of each of the non-voice frames replaced with the particular pattern in accordance with a certain rule. For a series of the non-voice frames, the pattern replacement unit 800 of the embodiment causes a position at which an amplitude level periodically changes to be the particular pattern replacement position.

The pattern replacement unit 800 is constituted by a voice analysis unit 801, an object frame selection unit 802, a particular pattern replacement unit 803 and a detection use pattern saving unit 804. Further, the particular pattern replacement unit 803 has a pattern position fixing unit 805. The pattern position fixing unit 805 has a function of fixing particular pattern replacement positions of a series of non-voice frames in accordance with a certain rule.

The voice analysis unit 801 takes in the code 300 every frame of 20 msec including 160 samples. Where the voice analysis unit 801 takes in the frames is the CE 107 (CE: core edge) illustrated in FIG. 1 and so on. As a matter of course, a network device other than the core edge will do.

Then, the voice analysis unit 801 analyzes a voice characteristic of the code that has been taken in. The voice characteristic is data that identifies a voice frame and a non-voice frame of the code. Specifically, the voice characteristic is formed by a number of zero-crossings and an amplitude level. The number of zero-crossings represents how many times a voice waveform crosses a zero level in a certain period of time. The amplitude level is an average amplitude value of each of data 310-318 in a certain period of time. The voice analysis unit 801 identifies a frame of a data amplitude level being equal to or greater than a certain value and of a number of zero-crossings being equal to or smaller than a certain number in a certain period of time as a voice frame. Further, the voice analysis unit 801 identifies background noise from the amplitude level and the number of zero-crossings which are the voice characteristic of the data.

In order to prevent portions of small amplitudes corresponding to a rise and a fall in voice from being clipped at a start and an end of a voice frame interval, respectively, the voice analysis unit 801 brings the start of the voice frame interval forward and puts the end of the voice frame interval off so as to severally give margins for identifying voice and non-voice frames.

The voice analysis unit 801 identifies whether the frame that has been taken in is a voice frame or a non-voice frame in order from the analysis of the voice characteristic. The voice characteristic is data that identifies a voice frame and a non-voice frame of the code 300. Specifically, the voice characteristic is formed by a number of zero-crossings and an amplitude level. The number of zero-crossings represents how many times a voice waveform of a zero-crossing wave crosses a zero level. The voice waveform of the zero-crossing wave is a waveform having no amplitude component. The amplitude level is an amplitude value of each of data 310-318. The voice analysis unit 801 identifies, in a certain period of time, a frame of a data amplitude level being equal to or greater than a certain value and taken in a certain period of time since the number of zero-crossings becomes equal to or greater than a certain number until the number of zero-crossings becomes equal to or smaller than a certain number as a voice frame. In order to prevent portions of small amplitudes corresponding to a rise and a fall in voice from being clipped at a start and an end of a voice frame interval, respectively, the voice analysis unit 801 brings the start of the voice frame interval forward and puts the end of the voice frame interval off so as to severally give margins for identifying voice and non-voice frames.

The object frame selection unit 802 selects the non-voice frame detected by the voice analysis unit 801 as a frame to be replaced with the particular pattern 319. Why the object frame selection unit 802 does not cause a voice frame to be a frame to be replaced with the particular pattern 319 is for preventing the particular pattern from causing noise. A non-voice frame is in general background noise data. Thus, a partial change of a non-voice frame can hardly be sensed as new voice quality degradation.

[Pattern Position Fixing Unit 805]

The particular pattern replacement unit 803 replaces a portion of the non-voice frame selected by the object frame selection unit 802 with the particular pattern 319. The pattern position fixing unit 805 fixes a position of the non-voice frame to be replaced with the particular pattern. That is, the pattern position fixing unit 805 fixes particular pattern replacement positions of a plurality of non-voice frames in accordance with a given rule. The above given rule is, e.g., the amplitude levels at the particular pattern replacement positions are periodically different in a series of the non-voice frames to be replaced. That is, the particular pattern replacement positions of the respective non-voice frames have a periodic correlation.

A process by means of the pattern position fixing unit 805 for fixing particular pattern replacement positions in a plurality of non-voice frames will be explained here. The function processed by the pattern position fixing unit 805 is a new function that the pattern replacement unit 800 has in comparison with the pattern replacement unit 101. The pattern position fixing unit 805 obtains a background noise level from the voice analysis unit 801. Then, the voice analysis unit 801 performs an amplitude analysis of a frame identified as a non-voice frame, and determines the background noise level 320. The amplitude analysis is a process by means of the voice analysis unit 801 for averaging amplitude values of non-voice frames for a certain period of time so as to cause the average value to be the background noise level. The pattern position fixing unit 805 causes a code pattern in a level range equal to or lower than the background noise level to be replaced with the particular pattern. The code pattern is a combination of bits of respective samples illustrating a same amplitude level in a frame formed by a plurality of samples. A portion of the code pattern to be replaced is formed by a combination of the codes in a level range equal to or lower than the background noise level, and the one formed with respect to the amplitude level is an example. If, e.g., the code 300 illustrated in FIG. 3 is taken as an example, the pattern position fixing unit 805 fixes a replacement position of the particular pattern 319 "010110 . . . 011". The replacement position of the particular pattern 319 of the embodiment is a code pattern position of a level in the level range equal to or lower than the background noise level and closest to an average value of the level range.

Then, for a plurality of non-voice frames that the particular pattern replacement unit 803 obtains in chronological order, the pattern position fixing unit 805 fixes a position to be replaced with the particular pattern (particular pattern replacement position) in accordance with a certain rule. That is, the pattern position fixing unit 805 fixes the particular pattern replacement position of a non-voice frame while referring to the particular pattern replacement position of a past non-voice frame.

The particular pattern is saved in the detection use pattern saving unit 804. The particular pattern replacement unit 803 reads the particular pattern from the detection use pattern saving unit 804. Then, the particular pattern replacement unit 803 replaces the position of the code pattern fixed by the pattern position fixing unit 805 with the particular pattern. Further, the particular pattern replacement unit 803 does not perform a particular pattern replacement process for a silent frame of volume imperceptible for a person. The silent frame is a frame such that frame data includes all zero bits or at most bits indicating a faint sound of a value equal to or lower than a certain threshold.

[Configuration of Pattern Test Unit 900]

Figure 9:
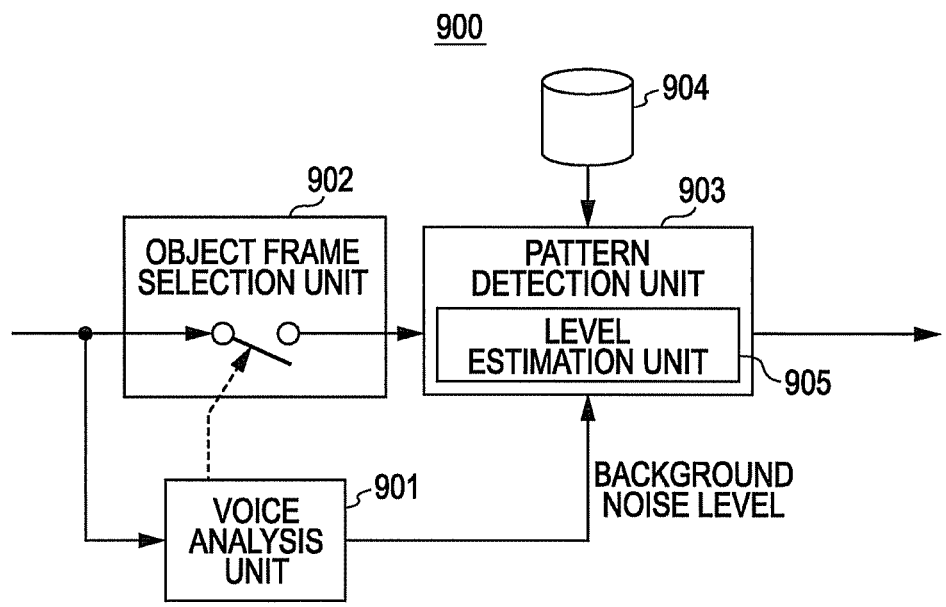
FIG. 9 is a block diagram of a test unit of the embodiment.

FIG. 9 illustrates a block diagram of a pattern test unit 900 of the embodiment.

The pattern test unit 900 can detect a level of inserted noise. The pattern test unit 900 detects the particular pattern replaced by the pattern replacement unit 800. Then, the pattern test unit 900 can calculate amplitude data of a level of the inserted noise from detection positions of respective particular patterns in the non-voice frames which are tested in order.

The pattern test unit 900 is constituted by a voice analysis unit 901, an object frame selection unit 902, a pattern detection unit 903 and a detection use pattern saving unit 904. The pattern detection unit 903 has a level estimation unit 905. The level estimation unit 905 estimates amplitude data of noise inserted in the network from data with respect to whether or not particular patterns exist in a plurality of non-voice frames obtained in chronological order.

The voice analysis unit 901 takes in the code 300 every frame of 20 msec including 160 samples. Then, the voice analysis unit 901 identifies whether the frame that has been taken in is a voice frame or a non-voice frame in order.

The object frame selection unit 902 selects the non-voice frame identified by the voice analysis unit 901 as a detection object of the particular pattern.

The voice analysis unit 901 analyzes an amplitude value of the non-voice frame and determines a background noise level.

The pattern detection unit 903 obtains the background noise level from the voice analysis unit 901, and determines a level range in which the particular pattern of the non-voice frame is tested with reference to the background noise level. Further, the particular pattern to be detected by the pattern detection unit 903 is saved in the detection use pattern saving unit 904.

Thus, the pattern detection unit 903 reads the particular pattern saved in the detection use pattern saving unit 904, and identifies whether or not the particular pattern exists in the non-voice frame while referring to the background noise level and the particular pattern that has been read.

[Level Estimation Unit 905]

Then, the level estimation unit 905 identifies regularity of the particular pattern detection positions of the non-voice frames obtained in order, and estimates amplitude data of noise inserted in the network. As to the pattern position fixing unit 805 of the pattern replacement unit 800, the particular pattern replacement unit 803 fixes a position to be replaced with the particular pattern for a series of non-voice frames in accordance with a given rule. Thus, the level estimation unit 905 identifies whether or not detection positions of the particular pattern in a plurality of the non-voice frames obtained in chronological order follow the given rule. Moreover, upon identifying the particular pattern detection position as not following the given rule, the level estimation unit 905 estimates amplitude data of inserted noise from the particular pattern detection position that does not follow the given rule.

For a series of non-voice frames, e.g., the pattern position fixing unit 805 fixes particular pattern replacement positions at which the amplitude levels are periodically different. Upon identifying the amplitude levels of the particular pattern replacement positions in a series of non-voice frames as not following the given rule, the level estimation unit 905 estimates amplitude data of the inserted noise from to what extent periodicity of the amplitude level is disturbed, i.e., an average value of an amplitude level of a particular pattern that should have been detected (an amplitude level of a particular pattern that the pattern detection unit 903 has not detected owing to noise).

Upon identifying a particular pattern as existing in a non-voice frame, the pattern detection unit 903 sends pattern replacement existence data indicating that the particular pattern exists in the object non-voice frame to the detection identification unit. If the pattern detection unit 903 identifies a particular pattern as not existing in the non-voice frame, the pattern detection unit 903 sends pattern replacement absence data indicating that no particular pattern exists in the object non-voice frame to the detection identification unit. Further, the pattern detection unit 903 also sends amplitude estimation data of inserted noise calculated by the level estimation unit 905 to the detection identification unit. If there is no inserted noise, the amplitude data of the inserted noise indicates "nothing", e.g., "0".

Figure 10:
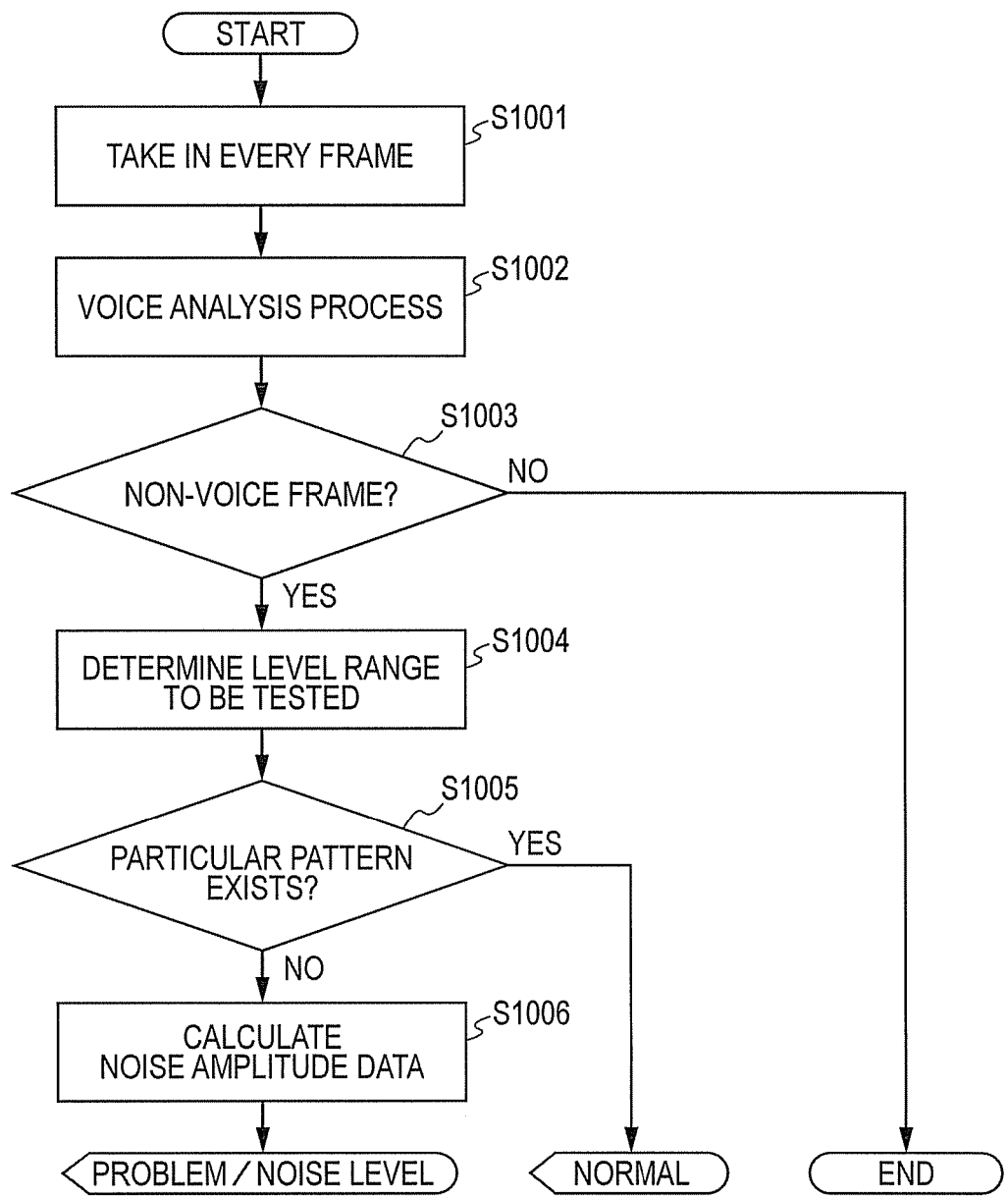
FIG. 10 is a flowchart of a process performed by the pattern test unit of the embodiment.

FIG. 10 illustrates a flowchart of a process performed by the pattern test unit 900 of the embodiment.

The voice analysis unit 901 takes in the code 300 every frame of 20 msec including 160 samples, and cuts a frame out (step S1001). The voice analysis unit 901 analyzes a voice characteristic of the frame that has been taken in (step S1002).

The voice analysis unit 901 identifies whether the frame that has been taken in is a voice frame or a non-voice frame in order from the analysis of the voice characteristic (step S1003).

If the voice analysis unit 901 identifies the frame that has been taken in as a non-voice frame (step S1003 YES), the object frame selection unit 902 selects the non-voice frame as an object to be tested with respect to the particular pattern. Then, the pattern test unit 903 obtains the background noise level from the voice analysis unit 901, and determines with reference to the background noise level a level range in which the particular pattern of the non-voice frame is tested (step S1004). The level range in which the particular pattern is tested is a portion of the code pattern in the non-voice frame for which the level is determined with reference to the background noise level in accordance with a certain rule. The code pattern is data of a combination of codes in the level range equal to or lower than the background noise level. A voice code chain is, e.g., data formed by bits of respective samples illustrating a same amplitude level in a frame formed by a plurality of samples.

The particular pattern to be detected by the pattern detection unit 903 is saved in the detection use pattern saving unit 904. The pattern detection unit 903 reads the particular pattern from the detection use pattern saving unit 904, and identifies whether or not the particular pattern exists in the level range equal to or lower than the background noise level in the non-voice frame while referring to the particular pattern (step S1005).

Upon identifying the particular pattern as existing in the non-voice frame (S1005 YES), the pattern detection unit 903 sends pattern replacement existence data indicating that the particular pattern exists in the non-voice frame to the detection identification unit.

Upon identifying the particular pattern as not existing in the non-voice frame (step S1005 NO), the level estimation unit 905 calculates amplitude data (noise level) of inserted noise (step S1006). The level estimation unit 905 identifies regularity of particular pattern detection positions of non-voice frames obtained in order, and estimates the amplitude data of the noise (noise level) inserted in the network system. In other words, the level estimation unit 905 identifies whether or not detection positions of the particular pattern in a series of the non-voice frames follow the given rule. Upon identifying the particular pattern detection positions as not following the given rule, the level estimation unit 905 estimates amplitude data of inserted noise (noise level) from the particular pattern detection position that does not follow the given rule. The pattern detection unit 903 sends pattern replacement absence data indicating that no particular pattern exists in a non-silent frame and the amplitude data of the inserted noise to the detection identification unit.

Further, if the voice analysis unit 901 identifies the frame that has been taken in as a voice frame (step S1003 NO), the pattern test unit 900 does not test the particular pattern 319.

As the pattern replacement unit 800 performs a replacement process of a particular pattern on a non-voice frame that flows in the network system and the pattern test unit 900 performs a detection process of the particular pattern, noise inserted in the network system can thereby be detected and further an amplitude level of the noise can be identified.

The network system of the embodiment can detect voice quality degradation caused by noise inserted in, the quality controlled area 115 in the network. Further, the network system of the embodiment can also detect voice quality degradation caused by a transcoding for converting a compression format of data in the quality controlled area 115 in the network. According to the test method of the embodiment, further, the pattern replacement unit 800 replaces a portion of the non-voice frame with the particular pattern. Thus, an amount of data that flows through the network system 100 does not increase. Hence, according to the test method of the embodiment, a traffic increase in the network caused by the test of voice quality degradation can be avoided. That is, the test method of the embodiment enables the voice quality degradation to be tested without causing ill effects such as a traffic increase in the network and resultant congestion.

Further, the test system is constituted by including the pattern replacement unit 101, the pattern test units 102 and 103 and the detection identification unit 104. The test system may be constituted by including the pattern replacement unit 800 instead of the pattern replacement unit 101, and the pattern test unit 900 instead of the pattern test units 102 and 103. Further, the digital signal corresponds to a signal into which an analog voice signal is encoded. Further, the particular signal corresponds to a code that constitutes the particular pattern.

INDUSTRIAL APPLICABILITY

The test method of the present invention is for testing voice quality degradation in a packet switching network. Thus, the test method of the present invention is quite useful for implementing detection of a factor of voice quality degradation inserted in the network without affecting voice communication even while the network is being operated.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. A system to assess a voice communication quality of a communication path between first and second nodes over a network, wherein coded data of voice communication signals is transferred in a stream of packets via the communication path, comprising:
   a processor; and
   a memory which stores a plurality of instructions, which when executed by the processor, cause the processor to execute,
      capturing at the first node at least one packet containing coded data representing non voice signals among the packets of the coded data to be transferred from the first node to the second node;
      replacing a part of the coded data representing non voice signals in a captured packet with a predetermined code before the captured packet is transferred from the first node;
      retrieving at the second node the at least one packet containing coded data representing non voice signals transferred from the first node; and
      assessing the voice communication quality of the communication path on a basis of a detection of the predetermined code in the retrieved packet,
   wherein pattern replacement process is performed on a non-voice frame containing non-voice sound.

2. The system according to claim 1, wherein the capturing captures the at least one packet containing coded data representing non voice signals among packets of the coded data representing sound signals, neglecting any packets of data representing an absence of sound signals.

3. The system according to claim 1, wherein the capturing captures at least one packet containing coded data representing background noise signals among the packets of the coded data.

4. The system according to claim 3, wherein the replacing replaces a part of the coded data representing background noise signals in the captured packet with a predetermined code before the captured packet is transferred from the first node, wherein the part of the coded data replaced is selected such that a level of the background noise signals reproduced by decoding the coded data contained in the retrieved packet remains unchanged.

5. The system according to claim 3, wherein the capturing calculates an amplitude level of background noise signals in packets representing the non voice signals.

6. The system according to claim 5, wherein the replacing replaces the part of the coded data representing non voice signals in the captured packet with the predetermined code by referring to the amplitude level of the background noise signals.

7. The system according to claim 5, wherein the replacing replaces a part belonging to a range equal to or lower than the amplitude level of the background noise signals in the packets representing the non voice signals with the predetermined code.

8. The system according to claim 1, wherein the replacing replaces the part of the coded data representing non voice signals in the captured packet with the predetermined code formed by a combination of particular codes.

9. The system according to claim 1, the plurality of instructions comprising:
   detecting the predetermined code in the retrieved packet.

10. A method comprising:
    capturing, at the first node, at least one packet containing coded data representing non voice signals among the packets of the coded data to be transferred from the first node to the second node;
    replacing a part of the coded data representing non voice signals in a captured packet with a predetermined code before the captured packet is transferred from the first node; and
    retrieving, at the second node, the at least one packet containing coded data representing non voice signals transferred from the first node; and
    assessing a voice communication quality of a communication path between first and second nodes over a network, wherein coded data of voice communication signals is transferred in a stream of packets via the communication path, and
    wherein the assessing assesses the voice communication quality of the communication path on a basis of a detection of the predetermined code in the retrieved packet, and
    wherein pattern replacement process is performed on a non-voice frame containing non-voice sound.

11. A non-transitory computer readable medium causing a processor to execute a process comprising:
    capturing, at the first node, at least one packet containing coded data representing non voice signals among the packets of the coded data to be transferred from the first node to the second node;
    replacing a part of the coded data representing non voice signals in a captured packet with a predetermined code before the captured packet is transferred from the first node; and
    retrieving, at the second node, the at least one packet containing coded data representing non voice signals transferred from the first node; and
    assessing a voice communication quality of a communication path between first and second nodes over a network, wherein coded data of voice communication signals is transferred in a stream of packets via the communication path, and
    wherein the assessing assesses the voice communication quality of the communication path on a basis of a detection of the predetermined code in the retrieved packet, and
    wherein pattern replacement process is performed on a non-voice frame containing non-voice sound.

* * * * *